Dec. 14, 1948.  A. V. LOUGHREN  2,456,204
INVERTER SYSTEM

Filed May 11, 1946  3 Sheets-Sheet 1

*INVENTOR:*
ARTHUR V. LOUGHREN,
BY
*ATTORNEY.*

Dec. 14, 1948.  A. V. LOUGHREN  2,456,204
INVERTER SYSTEM
Filed May 11, 1946  3 Sheets-Sheet 2

INVENTOR:
ARTHUR V. LOUGHREN,
BY
ATTORNEY

Dec. 14, 1948.  A. V. LOUGHREN  2,456,204
INVERTER SYSTEM
Filed May 11, 1946  3 Sheets-Sheet 3

INVENTOR:
ARTHUR V. LOUGHREN,
BY
ATTORNEY.

Patented Dec. 14, 1948

2,456,204

UNITED STATES PATENT OFFICE 2,456,204

INVERTER SYSTEM

Arthur V. Loughren, Great Neck, N. Y., assignor to Hazeltine Research, Inc., Chicago, Ill., a corporation of Illinois Application May 11, 1946, Serial No. 669,193

14 Claims. (Cl. 175—363)

This invention relates, in general, to electrical systems for inverting a unidirectional potential to an alternating one. It is particularly directed to inverter arrangements of the type in which the inversion to an alternating potential is accomplished through the agency of energy-storage devices charged and/or discharged through vapor electric-discharge devices, such as gas-filled tubes.

Inverters of this general type are already known to the art and, for the most part, comprise a single condenser and a pair of gas-filled tubes. The association of the condenser with the tubes is such that the condenser may be charged from a unidirectional source through one of the tubes, thereby to generate a first output pulse of one polarity. Thereafter, the condenser may be discharged through the alternate tube to produce a succeeding pulse of the opposite polarity. While this arrangement may be satisfactory for some installations, it has definite limitations so far as the frequency of the generated alternating potential is concerned. Specifically, this frequency must be maintained at such a low value that after any of the gas tubes is triggered the tube is permitted completely to deionize before the alternate one is rendered conductive. This is necessary in order to prevent the creation of a low-impedance path through the two gas tubes in series across the unidirectional source. Thus, it is seen that the described system is essentially a low-frequency one and for this reason may have a limited application.

It is an object of the present invention, therefore, to provide an electrical system for inverting a unidirectional potential to an alternating potential and which avoids the aforementioned limitation of prior arrangements.

It is another object of the invention to provide an improved electrical system for inverting a unidirectional potential to an alternating potential having a relatively high frequency.

It is a further object of the invention to provide an improved inverter system of the type utilizing vapor electric-discharge devices but which may have an operating frequency substantially independent of the deionization intervals of the discharge devices.

It is a specific object of the invention to provide an improved electrical system for continuously inverting a unidirectional potential to an alternating potential which may have a relatively high frequency.

In accordance with the invention, an electrical system for inverting a unidirectional potential to an alternating potential comprises a plurality of energy-storage devices and charging circuits connecting each of the storage devices independently of the others to a unidirectional potential source. A plurality of gaseous electric-discharge devices are provided as well as an impedance means for coupling the system to a load. The system has a first and a second group of circuits for discharging each of the storage devices independently of the others to supply pulses of opposite polarity to the impedance means. The circuits of each group individually include one of the energy-storage devices and one of the vapor electric-discharge devices connected in series relation with at least a portion of the impedance means, the impedance means contributing inherent coupling between the groups of circuits. Additionally, the system includes means for triggering the discharge devices in a predetermined progression, selecting one discharge device from each of the two groups in a sequence. Each circuit of both of the groups comprises inductance means for providing an oscillatory discharge of the storage device thereof thereby to develop on that storage device a charge which is effective to suppress, during the deionization period of the device included in the particular circuit, the tendency of coupling between the circuits of the groups to impede deionization of the discharge device of the particular circuit.

For a better understanding of the present invention, together with other and further objects thereof, reference is had to the following description taken in connection with the accompanying drawings, and its scope will be pointed out in the appended claims.

Figure 1:
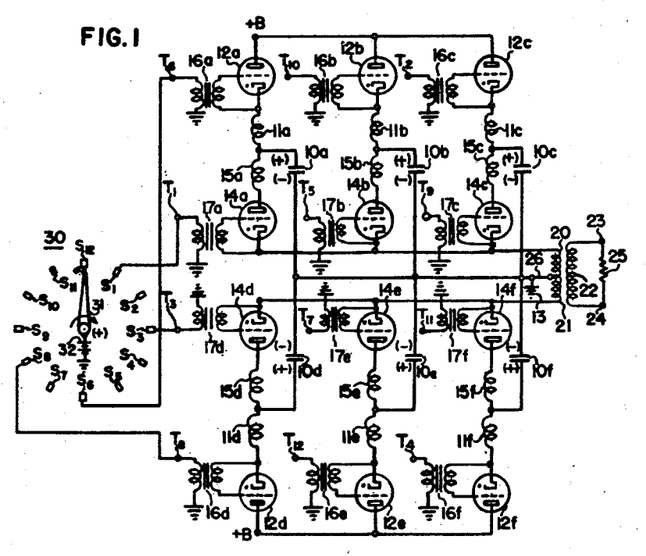
Fig. 1 is a schematic representation of an inverter system embodying the invention in one form.

Referring now more particularly to Fig. 1, the system there represented illustrates the application of the present invention to a continuously operating inverter for inverting a unidirectional potential to an alternating potential which may have a relatively high frequency. The system includes a plurality of energy-storage devices shown as identical condensers 10a—10f, inclusive, for receiving a charge from a unidirectional potential source one terminal of which is indicated +B. The other terminal of the source is maintained at ground potential. The condensers may be charged from the unidirectional potential source through controllable means which comprise charging reactors 11a—11f, inclusive, associated with different ones of the condensers in normally interrupted resonant-type charging circuits. With resonant charging, a potential may be established across a condenser which approximates twice the value of the charging source, but unless the charging circuit is interrupted when the potential first reaches this value, continuation of the resonant oscillation in the charging circuit reduces the value of the potential established across the condenser in accordance with a damped oscillation the final potential of which is equal to that of the charging source. For the circuit under consideration, vapor electric-discharge devices 12a—12f, inclusive, are individually included in one of the charging circuits appropriately to interrupt the circuit and retain a maximum charge condition upon the associated condenser. Devices 12a—12f may be gas-filled discharge tubes and have been illustrated as such in the drawings. They are connected in series relation with the charging reactors between source +B and the condensers, providing a series of similar charging circuits. For example, the charging circuit for condenser 10a includes the high-potential terminal +B, gas tube 12a, charging reactor 11a, and a common ground connection 13.

The system has another plurality of vapor electric-discharge devices 14a—14f, inclusive, for discharging the condensers by way of discharge circuits to be described presently. The discharge circuits include at least a part of an impedance means through which the inverter may be coupled to a load. The impedance means has been illustrated as a transformer, having a primary portion that is center tapped so as to comprise a first section 20 and a second section 21. It has a secondary portion 22 having output terminals 23, 24 to which a load may be connected. The load has been represented as a resistor 25.

Considering now more particularly the discharge circuits for the condensers, it is contemplated that these circuits be arranged in two groups for supplying pulses of opposite polarity to the transformer 20—22. The circuits of each group are normally interrupted and individually include one of the condensers 10a—10f and one of the gas-filled tubes 14a—14f connected in series relation with at least a portion of the primary winding of the output transformer. More specifically, the first group of condenser discharge circuits includes condensers 10a, 10b, and 10c. Each of the circuits of this group includes one of reactors 15a—15c and is completed through section 20 of the primary winding of the output transformer and a common conductor 26. The discharge circuits of the second group include the condensers 10d—10f. They likewise have discharge reactors 15d—15f and are completed through portion 21 of the primary winding of the output transformers. The reactors 15a—15f, inclusive, are selected so that the discharge circuits of both groups are oscillatory circuits. The half period of oscillation is preferably chosen equal to one-half period of the desired output frequency. The desirability of employing oscillatory discharge circuits having this value of half period will be apparent hereinafter.

The timing of the output pulses obtained from transformer 20—22 and, therefore, the frequency of the generated alternating potential is under the control of a commutating means for triggering the discharge devices of this system in a predetermined repeating progression. For the particular embodiment under consideration, discrete charging and discharging circuits are associated with each of the condensers 10a—10f and gas-filled tubes are included in each of these circuits for controlling the charging and discharging processes. For this reason, the commutating means of the system, designated generally at 30, has twelve commutating segments $S_1$—$S_{12}$, inclusive. These segments are to be connected with the correspondingly numbered synchronizing terminals $T_1$—$T_{12}$, inclusive. To avoid unduly complicating the drawings, however, connections have been shown only between segments, $S_1$, $S_3$, $S_6$, and $S_8$ with the corresponding terminals $T_1$, $T_3$, $T_6$, and $T_8$. A rotating brush 31, which may be driven from a continuously operating motor (not shown), wipes against the commutating segments in succession to complete a circuit from a potential source 32 to the terminals of the system in sequence. Each of the terminals $T_1$—$T_{12}$ is included in a synchronizing or triggering circuit for one of the gas-filled tubes. The synchronizing circuits for the charging tubes 12a—12f are identical, each including one of a plurality of pulse transformers 16a—16f, inclusive. The primary winding of each such transformer is connected from a synchronizing terminal to ground while the secondary winding thereof is directly connected between the cathode and control electrode of the associated gas-filled tube.

The synchronizing circuits for the condenser discharge paths are also of identical construction, each including one of a plurality of pulse transformers 17a—17f, inclusive. In each case, the primary winding of the pulse transformer is connected between a synchronizing terminal and ground while the secondary winding is directly connected between the cathode and control electrode of the associated gas-filled tube.

In explaining the operation of the inverter system of Fig. 1, it is convenient first to deal with one circuit from each of the above-identified first and second groups of circuits. To this end, the operation will be initially considered with respect to the condenser 10a of the first group and condenser 10d of the second group and it will be assumed that each condenser is fully charged from the source +B with the polarity indicated in Fig. 1. At the instant the commutator brush 31 engages segment $S_1$, a synchronizing pulse of positive polarity is applied to the input circuit of gas tube 14a over the synchronizing circuit including source 32, segment $S_1$, terminal $T_1$, and transformer 17a. The synchronizing pulse produces an electron discharge in tube 14a and completes the normally interrupted resonant discharge circuit for condenser 10a through reactor 15a and section 20 of the primary winding of the output transformer. Immediately upon the completion of this discharge circuit, condenser 10a starts to discharge through tube 14a to apply through transformer 20—22 a pulse of one polarity to the load 25.

Figure 2:
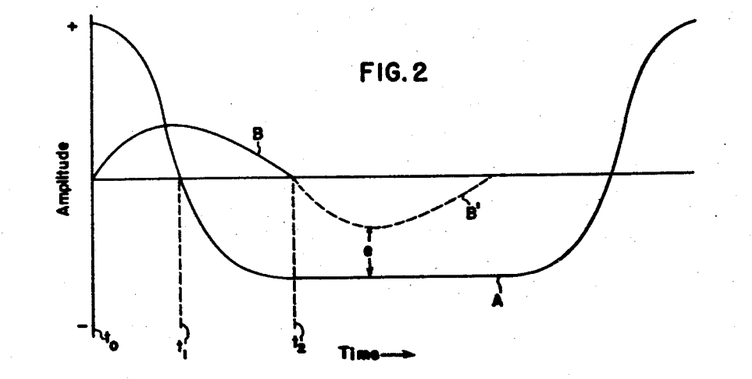
Figs. 2 and 3 include graphs used in explaining the operation of the system shown in Fig. 1.

The method in which the potential of condenser 10a varies in this operation is represented by curve A of Fig. 2. At the starting time $t_0$ when the synchronizing pulse is applied, the condenser has a maximum charge of one polarity, shown as positive in Figs. 1 and 2. As the condenser is discharged, some of the energy originally stored therein is transferred to the load 25 and some is stored in reactor 15a. At the time $t_1$, the energy initially stored in the condenser has been completely transferred to other portions of the discharge circuit. Immediately thereafter, a further transfer of energy takes place in the circuit, but this time from reactor 15a to the load and to condenser 10a. At the end of the cycle under consideration, shown at the time $t_2$ in Fig. 2, condenser 10a is negatively charged, that is, it has a charge opposite to that present at the starting time $t_0$, as shown by the curve A.

During the entire interval $t_0$—$t_2$, current flows in the discharge circuit of the condenser. It is this current flow which applies useful energy or an output pulse to the load 25. The output pulse has the wave form and polarity indicated by the full-line curve B in Fig. 2. With a resonant discharge circuit of the type mentioned, the pulse has approximately the wave form of a half cycle of a sinusoidal alternating current signal. At the time $t_2$, current flow has ceased in the discharge circuit of condenser 10a and deionization is commenced in gas tube 14a. The effect of the resonant discharge in reversing the potential of condenser 10a accelerates deionization in the gas tube. This is because the condenser, at the time $t_2$, applies an inverted voltage to the gas tube. By "inverted voltage" is meant a voltage of such polarity that it tends to cause conduction in the reverse, as distinguished from the usual forward, sense in the gas tube.

Assume further, that at time $t_2$, commutator brush 31 engages segment $S_3$ applying a synchronizing signal to gas tube 14d to render this tube conductive. The same type of energy transfer described in connection with condenser 10a now takes place in the discharge circuit of condenser 10d. The resulting current flow is through section 21 of the primary winding of transformer 20—22 and is in an opposite sense to that described for condenser 10a. Accordingly, the discharge of condenser 10d produces an output pulse of opposite polarity for application to load 25. This output pulse is represented by the broken-line curve B' of Fig. 2. Due to the mutual coupling between sections 20 and 21 of the primary winding of the transformer, the output pulse resulting from the discharge of condenser 10d is also applied to tube 14a included in the opposite group of oscillatory circuits.

As previously mentioned, this tube 14a started its deionization process at the time $t_2$ and is, therefore, deionizing at the instant when the second output pulse is derived. This second pulse is applied to the cathode of tube 14a with negative polarity and is thus seen to be a potential tending to cause conduction in the customary forward sense in the gas tube. If conduction results, deionization of the gas tube 14a is arrested and the system effectively breaks down at least so far as continuous operation is concerned.

In accordance with the invention, each of the circuits of the first and second groups identified above comprises means for providing a control effect to suppress, during the deionization period of the discharge device included in the particular circuit, the tendency of such intercoupling of the circuits of the groups to impede deionization of the discharge device of that particular circuit. This means, for the embodiment under consideration, comprises the reactor 15d which provides the resonant effect in the discharge circuit. As already pointed out, it is this resonant effect which causes the condenser 10a to have the inverted voltage at the time $t_2$. The parameters of the individual discharge circuits are proportioned with reference to the load 25 so that this inverted voltage, remaining on the condenser during the deionization period of the gas tube included in the discharge circuit thereof, exceeds the potential applied to the particular discharge circuit from transformer 20—22 in response to the triggering of the discharge device in any of the other circuits of the system. Thus, as shown in Fig. 2, the potential difference $e$ indicates that the inverted voltage (curve A) applied to gas tube 14a by condenser 10a during the deionization interval of tube 14a exceeds the peak value of the forward voltage (curve B') applied to the cathode of tube 14a in response to the discharge of condenser 10d. Therefore, deionization continues at the accelerated rate to restore the control of gas tube 14a to its synchronizing circuit.

Figures 3, 5:
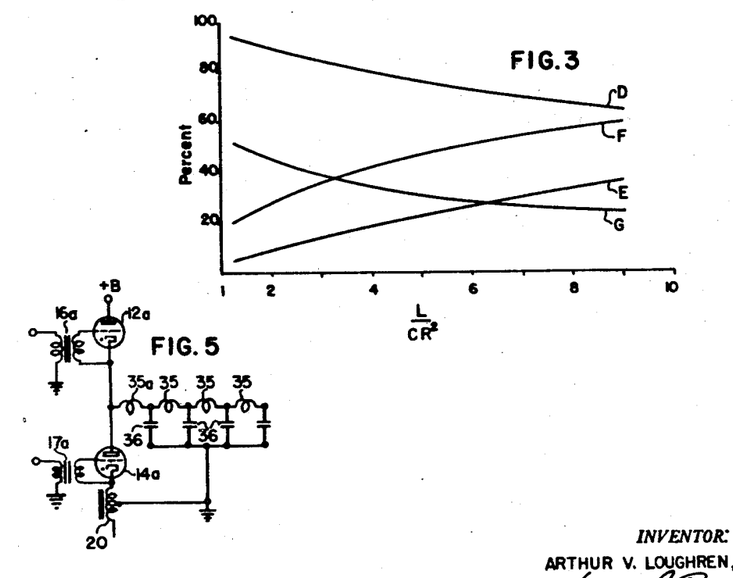
Fig. 5 is a schematic diagram showing a portion of the Fig. 1 arrangement in modified form.

The proportioning of the individual oscillatory discharge circuits of the two groups required to assure deionization of any gas-discharge device utilized for discharging a particular condenser may be understood from the curves of Fig. 3. The ordinate axis of this figure is in terms of per cent while the abscissa designates values of the factor $$\frac{L}{CR^2}$$

where L is the inductance, C the capacitance, and R the resistance of any of the oscillatory circuits in the presence of the load 25. Curve D shows the fraction of the energy initially stored in any of the condensers 10a—10f which is transferred to the load 25. Curve E is that portion of the energy of the condenser not so transferred. Curve F represents the inverted voltage of the condenser due to the described resonant effect of the discharge circuit and curve G is the peak value of the voltage fed back into any of the oscillatory circuits due to mutual coupling of the condenser discharge circuits through the sections 20 and 21 of the primary winding of the output transformer. Curves F and G intersect where the factor $$\frac{L}{CR^2}$$

has a value of approximately 3.1. Therefore, the parameters should be selected at least to satisfy this relation. Of course, the larger the value of this factor, the smaller is the useful energy obtained from the system. Therefore, it is not desirable to operate with values of this factor much in excess of 3.1.

In any oscillatory circuit where the parameters satisfy the relation $$\frac{1}{LC} = \frac{R^2}{4L^2} \qquad (1)$$

a condition of "critical damping" is present. Where the damping is equal to or greater than critical, no polarity reversal is experienced by the condenser in the discharge cycle. In fact, for the condition defined by Equation 1 the factor $$\frac{L}{CR^2}$$

has a value of 0.25 which is widely removed from the value required for successful operation. This indicates that it is contemplated to operate the system of Fig. 1 with substantially less than critical damping in the individual oscillatory circuits. The preferred value has already been indicated.

Figure 4:
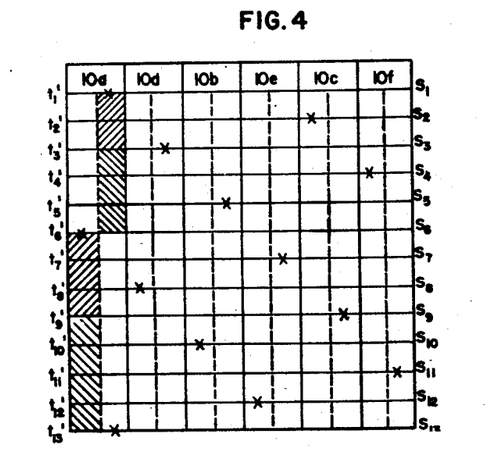
Fig. 4 is a timing table for the system of Fig. 1.

One illustrative timing sequence for all of the tubes in the system of Fig. 1 is set forth in the table of Fig. 4. This table is arranged with six columns, one column being assigned to each of the condensers 10a—10f. Each major column is subdivided into two parts with the one on the left assigned to charging intervals for the particular condenser and the one on the right assigned to discharge intervals. The time designations $t_1'$—$t_{12}'$, inclusive, designate succeeding instants in which the brush 31 is in contact with the corresponding segments $S_1$—$S_{12}$, respectively. The table shows the discharge circuit for condenser 10a to be completed at the time $t_1'$, this being accomplished as already mentioned by triggering tube 14a. At the time $t_2'$, the commutator energizes tube 12c and completes the charging circuit for condenser 10c. At the time $t_3'$, tube 14d is triggered to start the discharge of condenser 10d, etc. The crosshatched righthand portion of the column 10a starting at the time $t_1'$ and concluding at the time $t_3'$ shows the interval in which tube 14a is conductive, permitting condenser 10a to discharge. The oppositely sloped crosshatched portion between the times $t_3'$ and $t_6'$ denote the time available for deionization to take place in the condenser discharge tube 14a. The crosshatched left-hand portion of this column, starting at the time $t_6'$ and concluding at the time $t_9'$, denotes the conductive interval of tube 12t wherein recharging of condenser 10a is accomplished. The oppositely sloped crosshatched portion between the times $t_9'$ and $t_{13}'$ represents the time allowable for deionization of the charging tube 12a. The interval $t_6'$—$t_{13}'$, set aside for the condenser charging process, is somewhat longer than the interval $t_1'$—$t_6'$ allowed for the entire discharging process which is usually desired.

The firing sequence for the condenser discharge tubes 14a—14f, represented by the table of Fig. 4, is such that one discharge device from each of the above-defined two groups of the oscillatory discharge circuits is selected in a sequence. That is, pulses are delivered by the groups of circuits in alternation and since the circuits of each group are generally the same, the successive output pulses have substantially the same wave form, the same amplitude, but opposite polarity. Where the timing sequence is such that succeeding pulses merge into one another at the leading and trailing edges, the output signal approximates a sinusoidal signal which has a half period equal to the time $t_0$—$t_2$ in Fig. 2.

The commutator 30 repeats its progressive actuation of the gas tubes with a period which is at least equal to but, for the case at hand, much greater than the deionization period of any of the gas tubes. This means that at the time $t_{13}'$ of Fig. 4, when tube 14a is to be triggered again, a sufficient interval has elapsed from the time $t_1'$ to permit complete deionization of tube 14a, recharging of condenser 10a, and complete deionization of tube 12a. Therefore, continuous inversion may be obtained.

The resonant charging of condensers 10a—10f referred to above is desirable in that it permits the inverter to operate from a relatively low-voltage unidirectional source. Furthermore resonant charging enables the alternating potential output to have a relatively high peak value and is desirable from the standpoint of energy conservation. The tubes 12a—12f included in the charging circuits serve two important functions. In the first place, they interrupt the charging process when the condensers have received the maximum amount of energy obtainable with the particular charging arrangement. Additionally, they facilitate controlling the recharging of any condenser after the discharge thereof. It will be apparent, for example, that the condenser 10a, when fully charged from the source +B, establishes such a high cathode potential for tube 12a that the tube is rendered nonconductive. After the deionization process has taken place, the tube remains nonconductive until the application of a synchronizing signal to its input circuit. This control in the charging circuit precludes short-circuiting source +B when the discharge tube 14a is conductive or deionizing.

Under certain operating conditions, the charging tubes 12a—12f may be omitted. When resonant charging is desired, the charging tubes are not required so long as the timing sequence is such that a discharge path for any condenser is completed substantially in time coincidence with the establishment of the maximum charge on the condenser from the charging source. It is also necessary, however, that the charging circuit have an initial delay or inertia which is sufficient to permit deionization in the gas tube included in the discharge circuit of the condenser. This delay is inherent in resonant charging which features a very slow charging rate at the start of the charging cycle. Therefore, it is perfectly feasible in some applications of Fig. 1 to couple the source +B directly to the charging reactors 11a—11f.

The frequency of the alternating potential derived from the inverter system and applied to load 25 is determined primarily by the timing sequence established by commutator 30. It will be noted from the foregoing description that, when the discharge process in an oscillatory circuit from one of the two groups ends, a similar process in an oscillatory circuit of the other of the two groups may be commenced immediately. Therefore, alternating potentials of relatively high frequency may be obtained. For continuous inversion, it is only necessary that enough condensers, with their charging and discharging circuits, be provided that the first condenser discharged in the system be completely conditioned and made ready for a second discharge by the time the last condenser of the system has been discharged. Obviously, then, the system of Fig. 1 is very flexible and its operating characteristics may be conveniently varied by altering the number of condensers to be charged and discharged as well as the synchronizing circuits and the firing order established by the commutator 30.

It is not necessary that condensers be utilized as the energy-storage devices in all cases. Where the output signal is to have pulses of rectangular wave form and alternating polarity, it is convenient to replace each condenser with a transmission-line section in the manner represented in Fig. 5. Here, the transmission-line section includes series-connected inductors 35, 35 and intermediate shunt-connected condensers 36, 36. This line section is coupled with the unidirectional potential source +B through a normally interrupted charging circuit including a charging tube 12a. The discharge circuit for the line section comprises a gas tube 14a and one section of the transformer primary winding 20. This arrangement is substantially the same as that for any of the condensers 10a—10f of Fig. 1, except that the reactors 11 and 15 of Fig. 1 may be omitted, since their function is accomplished by the single reactor 35a connecting the high-potential side of the line section to tubes 12 and 14. This reactor, in practical installations, is of the same order of magnitude as the line inductors 35, 36. The duration of the rectangular pulse obtained from the discharge of line section 35, 36 is dependent upon the product of the total inductance and total capacitance of the line section. This may be selectively arranged for any desired pulse duration. It is to be understood that the discharge circuit for the line section is to be proportioned as particularly described in connection with the Fig. 1 arrangement to assure deionization of the gas tube 14a following any discharge of the line section.

Figure 6:
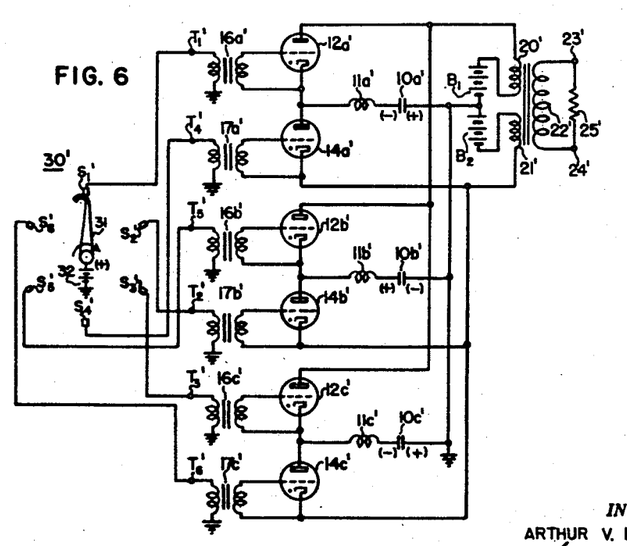
Fig. 6 is a schematic circuit diagram of another inverter in accordance with the invention; while Fig. 7 comprises curves used in explaining the operation of the system shown in Fig. 6.

A modified and simpler form of inverter is represented in Fig. 6. This system has condensers 10a'—10c', inclusive. A corresponding plurality of pairs of gas tubes is included in the system, each pair being associated with a different one of the condensers. The pairs are designated 12a'—14a', 12b'—14b', and 12c'—14c'. The system again has first and second groups of circuits for supplying pulses of opposite polarity to the output transformer 20'—22'. The circuits of each group individually include one of the condensers, one of the pair of discharge tubes associated with the particular condenser, and a unidirectional potential source connected in series relation with the primary winding of the output transformer. For example, one circuit of the first group includes the condenser 10a', reactor 11a', gas tube 12a', winding section 20', and source B₁. The corresponding circuit of the second group includes the condenser 10a', reactor 11a', gas tube 14a', winding 21', and a second potential source B₂. The other reactors 11b' and 11c' associate the remaining condensers 10b' and 10c' in like manner with the output transformer through the pair of gas tubes associated with each such condenser. The synchronizing circuits for controlling the gas tubes are generally similar to that of Fig. 1, corresponding components thereof being identified by like reference characters primed.

Figure 7:
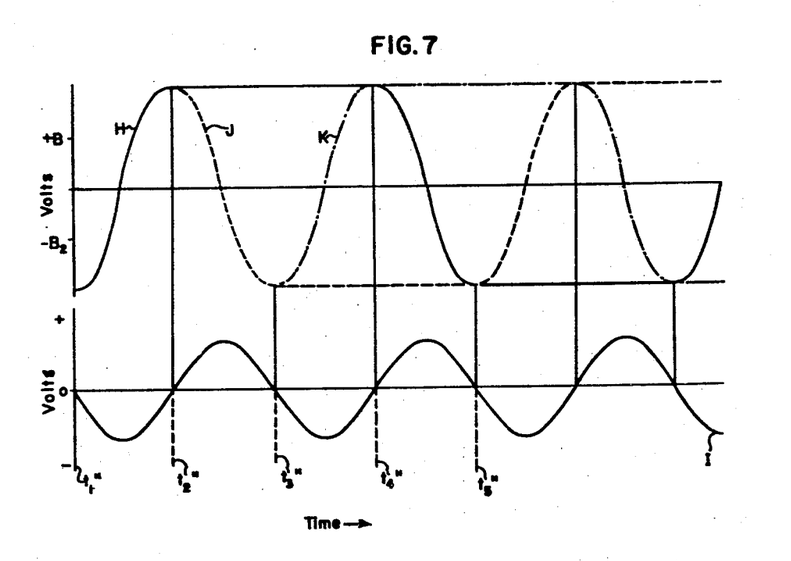

The operation of the inverter system of Fig. 6 is represented by the curves of Fig. 7. Assume that the condensers 10a'—10c' are fully charged with the polarity indicated in Fig. 6 and that at the instant $t_1''$ tube 12a' is fired. The condenser 10a' undergoes a potential variation generally similar to that fully described in connection with the portion of curve A in Fig. 2 included within the ordinate lines $t_0$—$t_2$. Consequently, at the time $t_2''$ the charge condition of condenser 10a is reversed, having been changed from negative to positive, as shown by the curve H. The first output pulse of negative polarity is thereby delivered through winding section 20' to the load 25', as indicated by curve I. The potential of the condenser 10a' at the time $t_2''$ constitutes an inverse voltage for tube 12a' and accelerates its deionization.

Also, at the instant $t_2''$, tube 14b' is triggered, discharging condenser 10b' through winding section 21' of the output transformer during the interval $t_2''$—$t_3''$. In this manner a succeeding pulse of positive polarity is supplied to the load and the charge condition of condenser 10b' is changed from an initial positive value to a negative one, as shown by curve J. Thus, condenser 10b' accelerates deionization in tube 14b'.

At the instant $t_3''$, tube 12c' is triggered, discharging condenser 10c' through transformer section 20'. This provides an output pulse of negative polarity and changes the charge condition of condenser 10c', as represented by curve K. At the time $t_4''$, tube 14a' is rendered conductive to change the charge of condenser 10a' in the manner shown by curve H. In like fashion, each of the condensers is charged in one sense through one of the pair of tubes associated therewith and is then charged in an opposite sense through the alternate tube of each pair. At least one complete period of the alternating potential generated is permitted for any of the tubes to deionize before its companion tube is triggered. Notice, fo example, tube 12a' becomes nonconductive at the interval $t_2''$ and has until the time $t_4''$ to complete deionization. The interval $t_2''$—$t_4''$ is equal to a full period of the generated alternating signal.

The oscillatory circuits for each condenser 10a'—10c' must also be proportioned with reference to the load to assure deionization in the manner described in connection with the curves of Fig. 2. This result may be accomplished by having the circuit damping such that the charge remaining on any condenser, say condenser 10a', after the discharge of one of its tubes, say tube 12a', exceeds the potential fed back to the anode-cathode electrodes of this tube in response to the discharge of any of the other condensers in the system. In view of the sources B₁ and B₂ included in the oscillatory circuits, the factor $$\frac{L}{CR^2}$$

for the Fig. 6 arrangement has an optimum value somewhat in excess of 3.1.

Where alternating potentials of very high frequencies are desired, there is a possibility that a full period of the alternating potential may be insufficient for the deionization of the gas tubes. This would impair the operation of the system, but it may be overcome by adding one or more condensers with paired gas tubes as shown in Fig. 6. Of course, corresponding modifications are required in the number of synchronizing circuits. The addition of more condensers permits several periods of the alternating potential to be available for the deionization time of any of the gas tubes.

In each of the described system, continuous inversion may be accomplished to derive an alternating potential from a unidirectional one. The frequency of the generated signal may be very high and is independent of the deionization intervals of the gas tubes. That is to say, the gas tubes may be actuated in rapid order without the need for a delay in the firing of any tube to permit deionization of the previously fired one.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electrical system for inverting a unidirectional potential to an alternating potential comprising, a plurality of energy-storage devices; charging circuits connecting each of said devices independently of the others to a unidirectional potential source, a plurality of gaseous electric-discharge devices, impedance means for coupling said system to a load, a first and a second group of circuits for discharging each of said storage devices independently of the others to supply pulses of opposite polarity to said impedance means, said circuits of each group individually including one of said storage devices and one of said discharge devices connected in series relation with at least a portion of said impedance means constituting inherent coupling between said groups of circuit, and means for triggering said discharge devices in a predetermined progression, selecting one discharge device from each of said groups in a sequence, each circuit of both of said groups comprising inductance means for providing an oscillatory discharge of the storage device thereof thereby to develop on said storage device a charge which is effective to suppress, during the deionization period of the discharge device included in the particular circuit, the tendency of said coupling between said circuits of said groups to impede deionization of said discharge device of said particular circuit.

2. An electrical system for inverting a unidirectional potential to an alternating potential comprising, a plurality of condensers; charging circuits connecting each of said condensers independently of the others to a unidirectional potential source, a plurality of gaseous electric-discharge devices, impedance means for coupling said system to a load, a first and a second group of circuits for discharging each of said condensers independently of the others to supply pulses of opposite polarity to said impedance means, said circuits of each group individually including one of said condensers and one of said discharge devices connected in series relation with at least a portion of said impedance means constituting inherent coupling between said groups of circuits, and means for triggering said discharge devices in a predetermined progression, selecting one discharge device from each of said groups in a sequence, each circuit of both of said groups comprising inductance means for providing an oscillatory discharge of the condenser thereof thereby to develop on said condenser a charge which is effective to suppress, during the deionization period of the discharge device included in the particular circuit, the tendency of said coupling between said circuits of said groups to impede deionization of said discharge device of said particular circuit.

3. An electrical system for inverting a unidirectional potential to an alternating potential comprising, a plurality of transmission-line sections; charging circuits connecting each of said line sections independently of the others to a unidirectional potential source, a plurality of gaseous electric-discharge devices, impedance means for coupling said system to a load, a first and a second group of circuits for discharging each of said line sections independently of the others to supply pulses of opposite polarity to said impedance means, said circuits of each group individually including one of said line sections and one of said discharge devices connected in series relation with at least a portion of said impedance means constituting inherent coupling between said groups of circuits, and means for triggering said discharge devices in a predetermined progression, selecting one discharge device from each of said groups in a sequence, each circuit of both of said groups comprising inductance means for providing an oscillatory discharge of the line section thereof thereby to develop on said line section a charge which is effective to suppress, during deionization period of the discharge device included in the particular circuit, the tendency of said coupling between said circuits of said groups to impede deionization of said discharge device of said particular circuit.

4. An electrical system for inverting a unidirectional potential to an alternating potential comprising, a plurality of energy-storage devices; charging circuits connecting each of said devices independently of the others to a unidirectional potential source, a plurality of gaseous electric-discharge devices, a transformer having a primary portion and a secondary portion for coupling said system to a load, a first and a second group of circuits for discharging each of said storage devices independently of the others to supply pulses of opposite polarity to said transformer, said circuits of each group individually including one of said storage devices and one of said discharge devices connected in series relation with at least a portion of said primary portion of said transformer which thereby provides inherent coupling between said groups of circuits, and means for triggering said discharge devices in a predetermined progression, selecting one discharge device from each of said groups in a sequence, each circuit of both of said groups comprising inductance means for providing an oscillatory discharge of the storage device thereof thereby to develop on said storage device a charge which is effective to suppress, during the deionization period of the discharge device included in the particular circuit, the tendency of said coupling between said circuits of said groups to impede deionization of said discharge device of said particular circuit.

5. An electrical system for inverting a unidirectional potential to an alternating potential comprising, a plurality of energy-storage devices; charging circuits connecting each of said devices independently of the others to a unidirectional potential source, a plurality of gaseous electric-discharge devices, a transformer having a two-section primary winding and a secondary winding for coupling said system to a load, a first and a second group of circuits for discharging each of said storage devices independently of the others to supply pulses of opposite polarity to said transformer, said circuits of each group individually including one of said storage devices and one of said discharge devices connected in series relation with one section of said primary winding which thereby provides inherent coupling between said groups of circuits, and means for triggering said discharge devices in a predetermined progression, selecting one discharge device from each of said groups in a sequence, each circuit of both of said groups comprising inductance means for providing an oscillatory discharge of the storage device thereof thereby to develop on said storage device a charge which is effective to suppress, during the deionization period of the discharge device included in the particular circuit, the tendency of said coupling between said circuits of said groups to impede deionization of said discharge device of said particular circuit.

6. An electrical system for inverting a unidirectional potential to an alternating potential comprising, a plurality of energy-storage devices; charging circuits connecting each of said devices independently of the others to a unidirectional potential source, a plurality of gaseous electric-discharge devices, a transformer having a two-section primary winding and a secondary winding for coupling said system to a load, a first and a second group of circuits for discharging each of said storage devices independently of the others to supply pulses of opposite polarity to said transformer, said circuits of each group individually including one of said storage devices and one of said discharge devices connected in series relation with one section of said primary winding constituting the only component of coupling between said groups of circuits, and means for triggering said discharge devices in a predetermined progression, selecting one discharge device from each of said groups in a sequence, each circuit of both of said groups comprising inductance means for providing an oscillatory discharge of the storage device thereof thereby to develop on said storage device a charge which is effective to suppress, during the deionization period of the discharge device included in the particular circuit, the tendency of said coupling between said circuits of said groups established through said transformer windings to impede deionization of said discharge device of said particular circuit.

7. An electrical system for inverting a unidirectional potential to an alternating potential of a selected frequency comprising, a plurality of energy-storage devices; charging circuits connecting each of said devices independently of the others to a unidirectional potential source, a plurality of gaseous electric-discharge devices, impedance means for coupling said system to a load, a first and a second group of oscillatory circuits resonant at said selected frequency for discharging each of said storage devices independently of the others to supply pulses of opposite polarity to said impedance means, said circuits of each group individually including one of said storage devices and one of said discharge devices connected in series relation with at least a portion of said impedance means constituting inherent coupling between said groups of circuits, and means for triggering said discharge devices in a predetermined progression, selecting one discharge device from each of said groups in a sequence, each circuit of both of said groups having parameters proportioned with reference to said load to develop on the storage device thereof a charge which is effective to suppress, during the deionization period of the discharge device included in the particular circuit, the tendency of said coupling between said circuits of said groups to impede deionization of said discharge device of said particular circuit.

8. An electrical system for inverting a unidirectional potential to an alternating potential comprising, a plurality of energy-storage devices; charging circuits connecting each of said devices independently of the others to a unidirectional potential source, a plurality of gaseous electric-discharge devices, impedance means for coupling said system to a load, a first and a second group of oscillatory circuits for discharging each of said storage devices independently of the others to supply pulses of opposite polarity to said impedance means, said circuits of each group individually including one of said storage devices and one of said discharge devices connected in series relation with at least a portion of said impedance means constituting inherent coupling between said groups of circuits, and means for triggering said discharge devices in a predetermined progression, selecting one discharge device from each of said groups in a sequence, each circuit of both of said groups having an inductance L, a capacitance C and an effective resistance R in the presence of said load of such values that the factor $$\frac{L}{CR^2}$$

for each circuit is at least equal to 3.1.

9. An electrical system for inverting a unidirectional potential to an alternating potential comprising, a plurality of energy-storage devices; charging circuits connecting each of said devices independently of the others to a unidirectional potential source, a plurality of gaseous electric-discharge devices, impedance means for coupling said system to a load, a first and a second group of oscillatory circuits for discharging each of said storage devices independently of the others to supply pulses of opposite polarity to said impedance means, said circuits of each group individually including one of said storage devices and one of said discharge devices connected in series relation with at least a portion of said impedance means constituting inherent coupling between said groups of circuits, and means for triggering said discharge devices in a predetermined progression, selecting one discharge device from each of said groups in a sequence, each circuit of both of said groups having an inductance L, a capacitance C and an effective resistance R in the presence of said load of such values that the factor $$\frac{L}{CR^2}$$

for each circuit is approximately equal to 3.1.

10. An electrical system for inverting a unidirectional potential to an alternating potential of a selected frequency comprising, a plurality of similar energy-storage devices; charging circuits connecting each of said devices independently of the others to a unidirectional potential source, a plurality of similar gaseous electric-discharge devices, impedance means for coupling said system to a load, a first and a second group of similar circuits for discharging each of said storage devices independently of the others to supply pulses of substantially the same amplitude and wave form but opposite polarity to said impedance means, said circuits of each group individually including one of said storage devices and one of said discharge devices connected in series relation with at least a portion of said impedance means constituting inherent coupling between said groups of circuits, and means for triggering said discharge devices in a predetermined progression, selecting one discharge device from each of said groups in a sequence, each circuit of both of said groups comprising inductance means for providing an oscillatory discharge of the storage device thereof oscillating at said selected frequency thereby to develop on said storage device a charge which is effective to suppress, during the deionization period of the discharge device included in the particular circuit, the tendency of said coupling between said circuits of said groups to impede deionization of said discharge device of said particular circuit.

11. An electrical system for inverting a unidirectional potential to an alternating potential of a selected frequency comprising, a plurality of energy-storage devices; charging circuits connecting each of said devices independently of the others to a unidirectional potential source, a plurality of gaseous electric-discharge devices, a transformer having a two-section primary winding and a secondary winding for coupling said system to a load, a first and a second group of oscillatory circuits resonant at said selected frequency for discharging each of said storage devices independently of the others to supply pulses of opposite polarity to said transformer, said circuits of each group individually including one of said storage devices and one of said discharge devices connected in series relation with at least a portion of one section of said primary winding which thereby provides inherent coupling between said groups of circuits, and means for triggering said discharge devices in a predetermined progression, selecting one discharge device from each of said groups in a sequence, each circuit of both of said groups having an inductance and a capacitance so proportioned with reference to said load that the potential remaining on the storage device of the particular circuit, during the deionization period of the discharge device of said particular circuit, exceeds the potential applied to said particular circuit through said transformer in response to the triggering of the discharge device in any of the other circuits.

12. An electrical system for continuously inverting a unidirectional potential to an alternating potential comprising, a plurality of energy-storage devices; charging circuits connecting each of said devices independently of the others to a unidirectional potential source, a plurality of gaseous electric-discharge devices, impedance means for coupling said system to a load, a first and a second group of circuits for discharging each of said storage devices independently of the others to supply pulses of opposite polarity to said impedance means, said circuits of each group individually including one of said storage devices and one of said discharge devices connected in series relation with at least a portion of said impedance means constituting inherent coupling between said groups of circuits, and means for triggering said discharge devices, selecting one discharge device from each of said groups of said circuits in sequence and in a repeating progression having a period at least equal to the deionization period of said discharge devices, each circuit of both of said groups comprising inductance means for providing an oscillatory discharge of the storage device thereof thereby to develop on said storage device a charge which is effective to suppress, during the deionization period of the discharge device included in the particular circuit, the tendency of said coupling between said circuits of said groups to impede deionization of said discharge device of said particular circuit.

13. An electrical system for inverting a unidirectional potential to an alternating potential comprising, a plurality of energy-storage devices, controllable charging means for connecting each of said storage devices independently of the others to a unidirectional potential source, a corresponding plurality of gaseous electric-discharge devices, impedance means for coupling said system to a load, a first and a second group of discharge circuits for said storage devices for discharging each of said storage devices independently of the others to supply pulses of opposite polarity to said impedance means, said circuits individually including a different one of said storage devices and a different one of said discharge devices connected in series relation with at least a portion of said impedance means constituting inherent coupling between said groups of circuits, means for triggering said discharge devices in a predetermined progression, selecting one discharge device from each of said groups in a sequence, each circuit of both of said groups comprising inductance means for providing an oscillatory discharge of the storage device thereof thereby to develop on said storage device a charge which is effective to suppress, during the deionization period of the discharge device included in the particular circuit, the tendency of said coupling between said circuits of said groups to impede deionization of said discharge device of said particular circuit, and means for controlling said charging means to recharge each of said storage devices folowing the deionization period of its associated discharge device.

14. An electrical system for inverting a unidirectional potential to an alternating potential comprising, a plurality of energy-storage devices, a corresponding plurality of pairs of gaseous electric-discharge devices, each pair being associated with a different one of said storage devices, impedance means for coupling said system to a load, a first and a second group of circuits for supplying pulses of opposite polarity to said impedance means, said circuits of each group individually including one of said storage devices, one of the pair of discharge devices associated therewith and a unidirectional potential source connected in series relation with at least a portion of said impedance means constituting inherent coupling between said groups of circuits, and means for triggering said discharge devices in a predetermined progression, selecting one discharge device from each of said groups of circuits in such a sequence that the second discharge device of any of said pairs is selected only after the deionization period of the companion device of the pair, each circuit of both of said groups comprising inductance means for providing an oscillatory discharge of the storage device thereof thereby to develop on said storage device a charge which is effective to suppress, during the deionization period of the discharge device included in the particular circuit, the tendency of said coupling between said circuits of said groups to impede deionization of said discharge device of said particular circuit.

ARTHUR V. LOUGHREN.

REFERENCES CITED

The following references are of record in the file of this patent:

UNITED STATES PATENTS

| Number | Name | Date |
|---|---|---|
| 1,702,402 | Hazeltine | Feb. 19, 1929 |
| 2,256,859 | Bouwers | Sept. 23, 1941 |
| 2,338,118 | Klemperer | Jan. 4, 1944 |